June 26, 1928.　　　　　　　　　　　　　　1,675,253
P. J. CLIFFORD
AUTOMATIC TRAIN CONTROL APPARATUS
Original Filed Feb. 20, 1923　　10 Sheets-Sheet 5
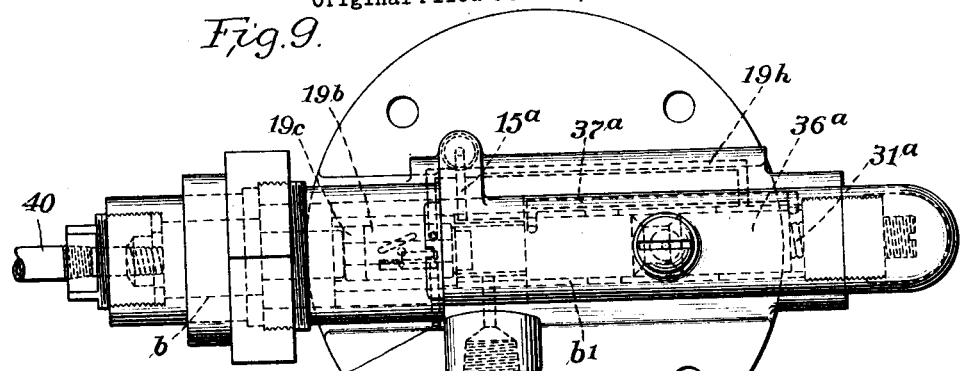
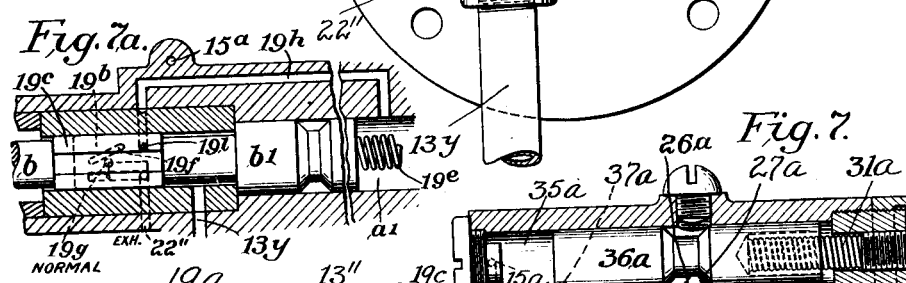
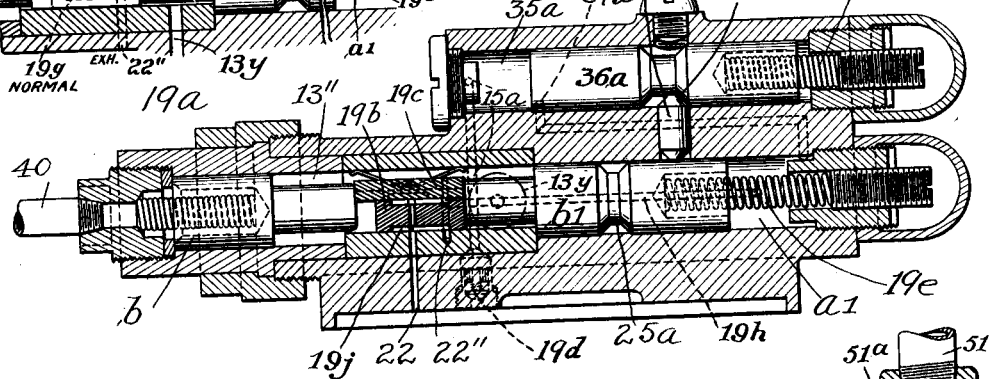
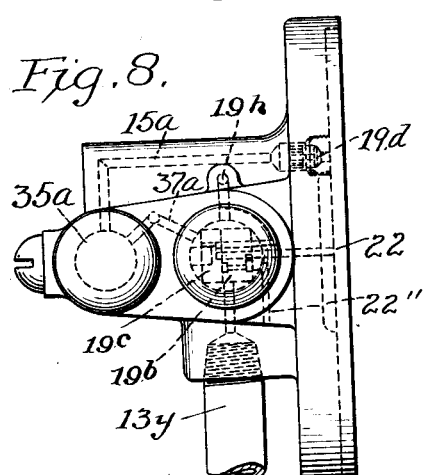
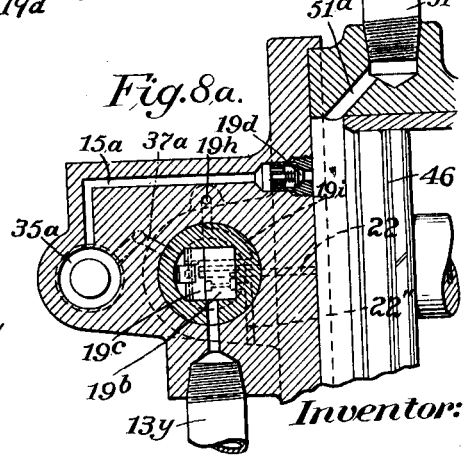
Inventor:
Patrick J. Clifford,

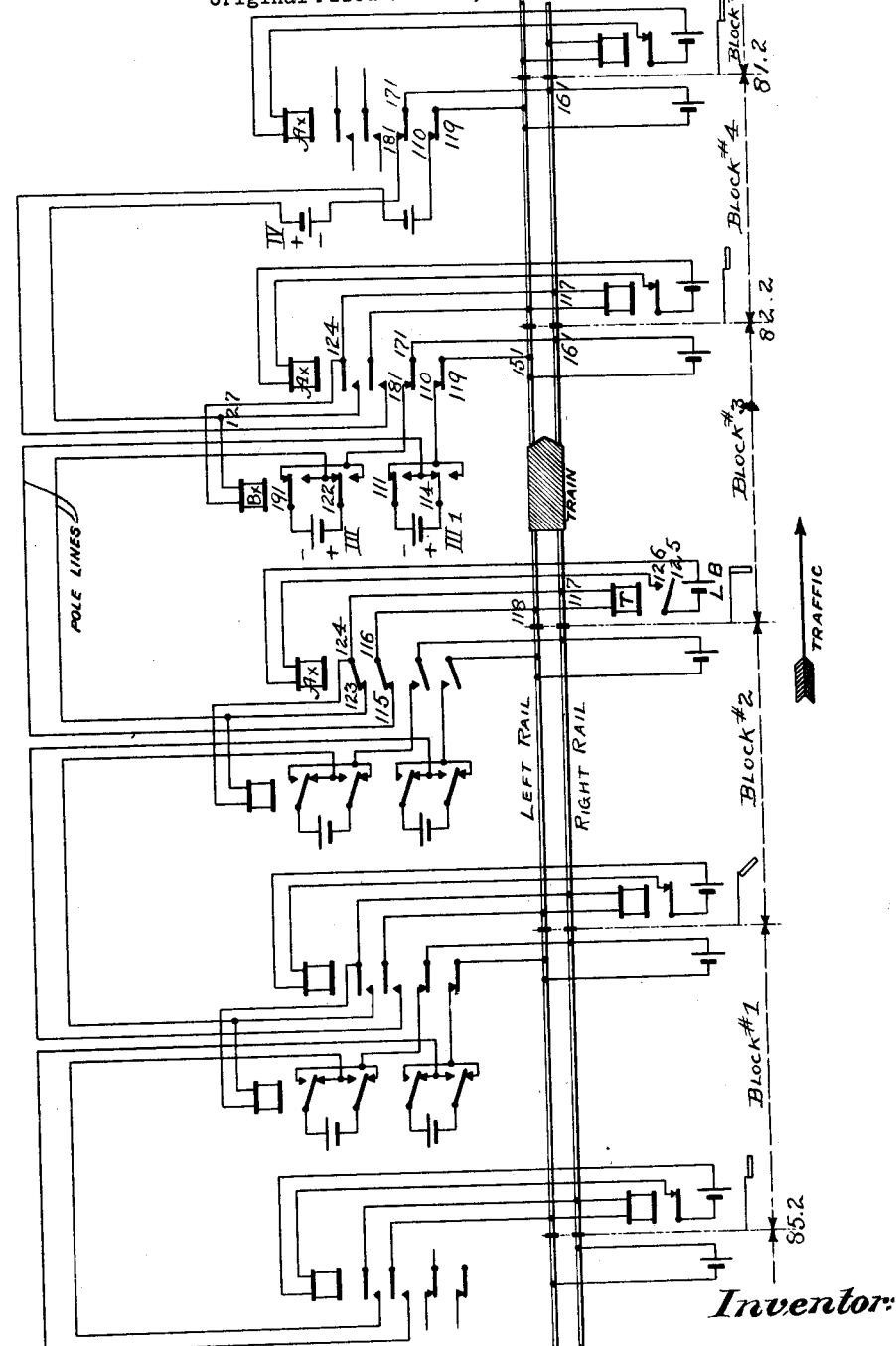

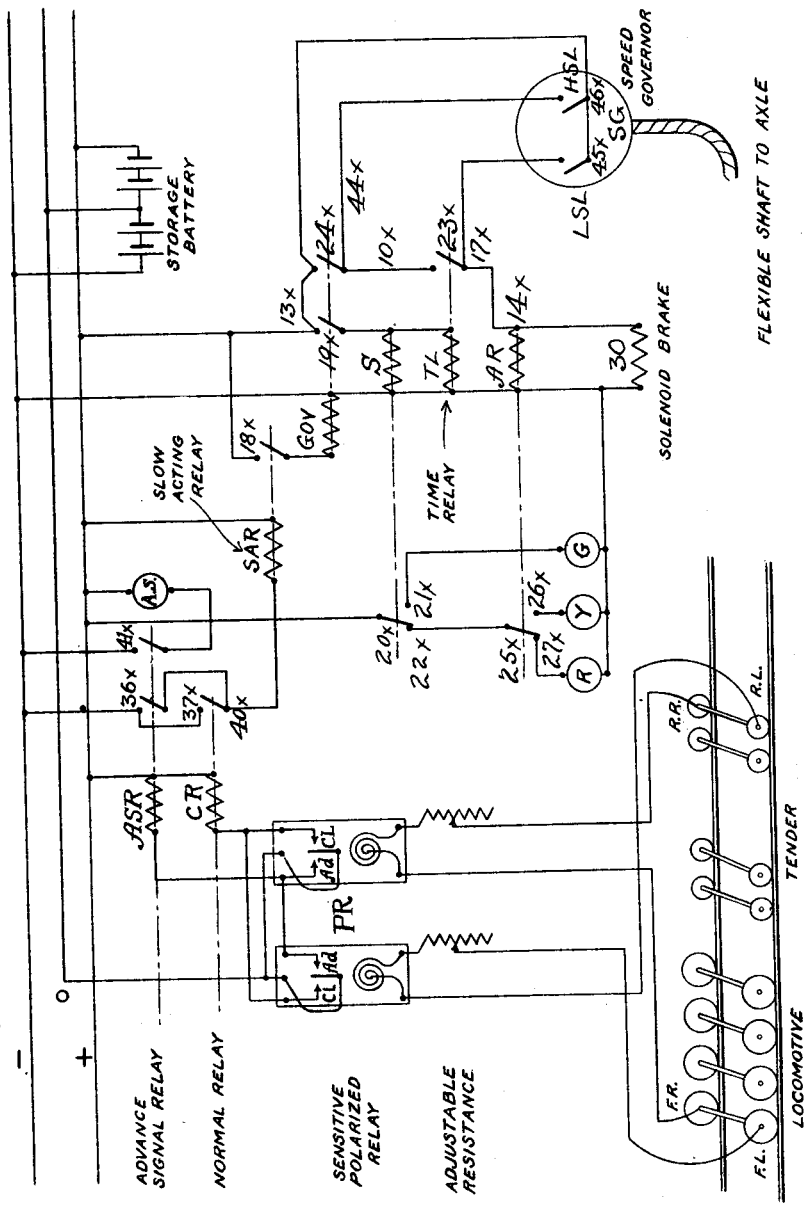

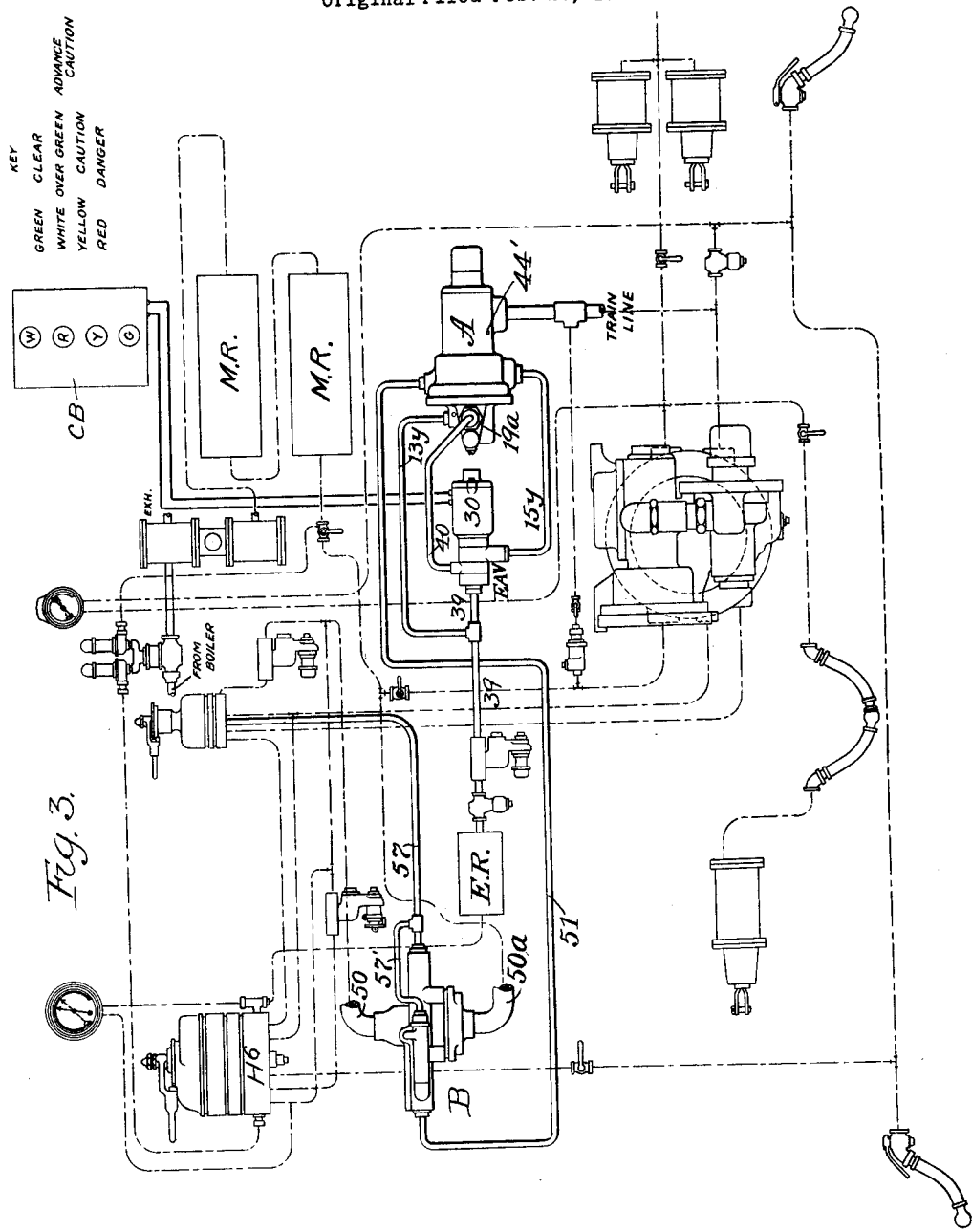

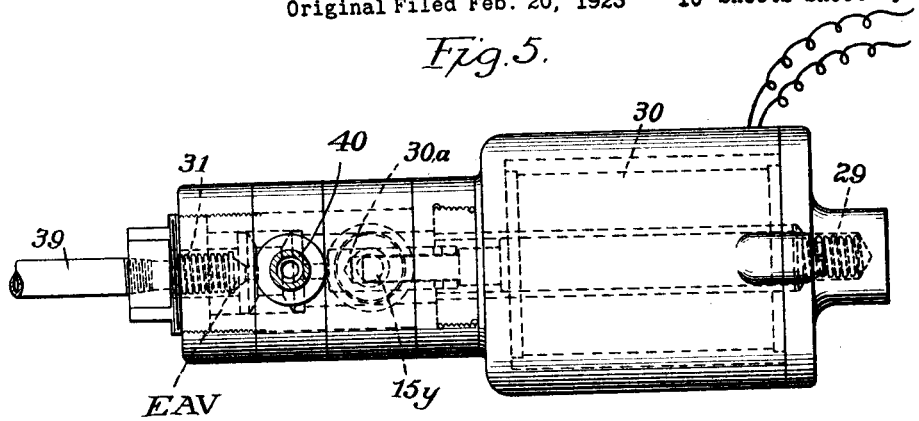
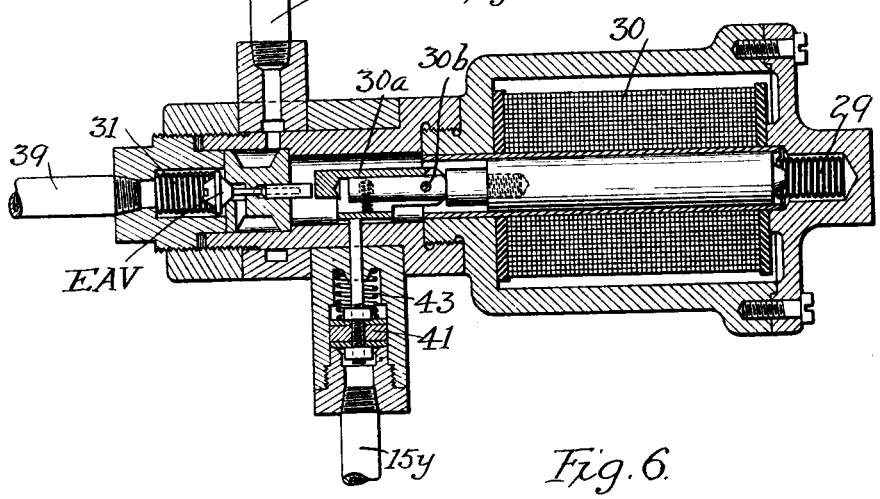
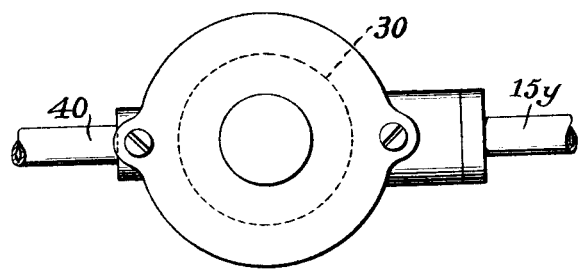
Inventor:
Patrick J. Clifford,

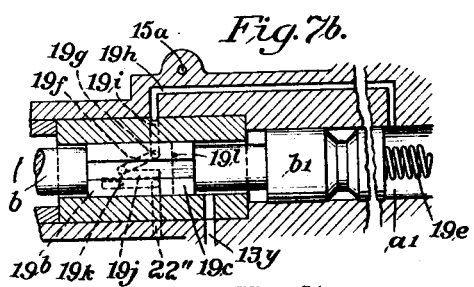
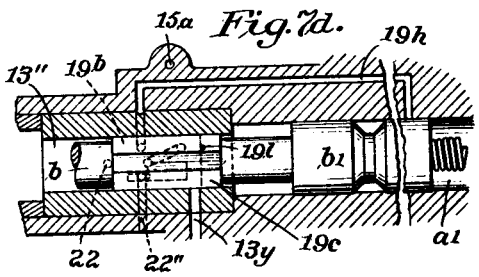
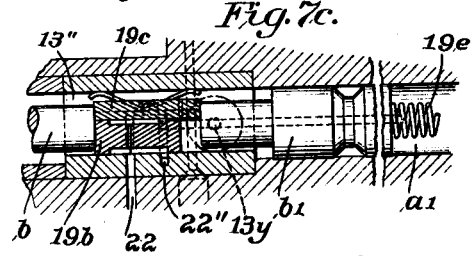
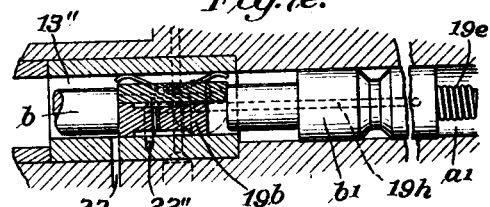
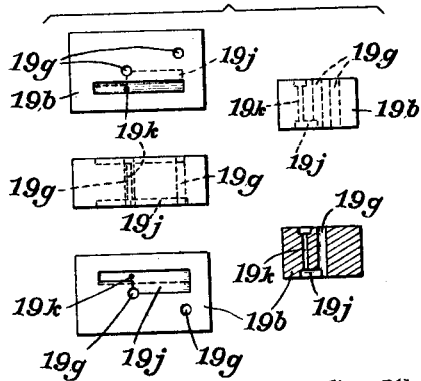
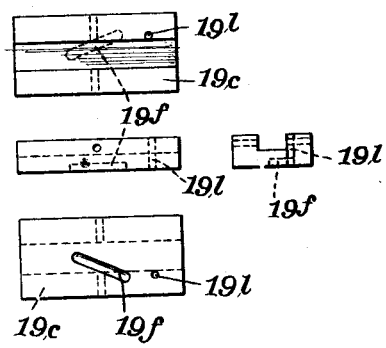
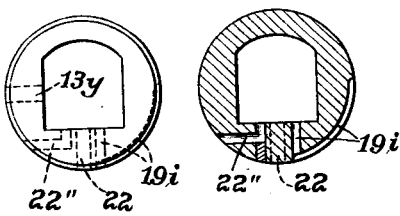
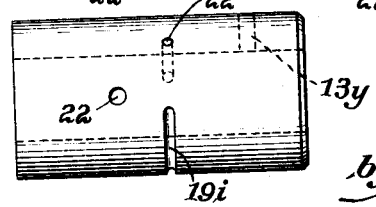

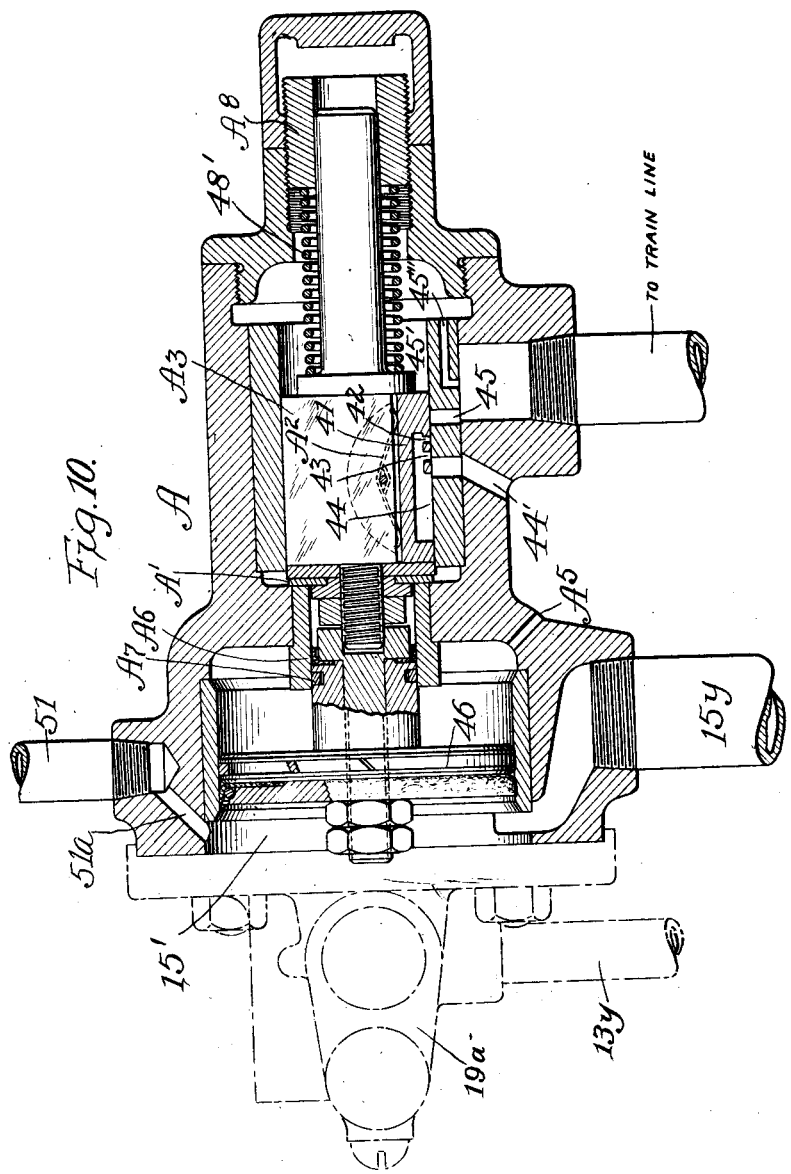

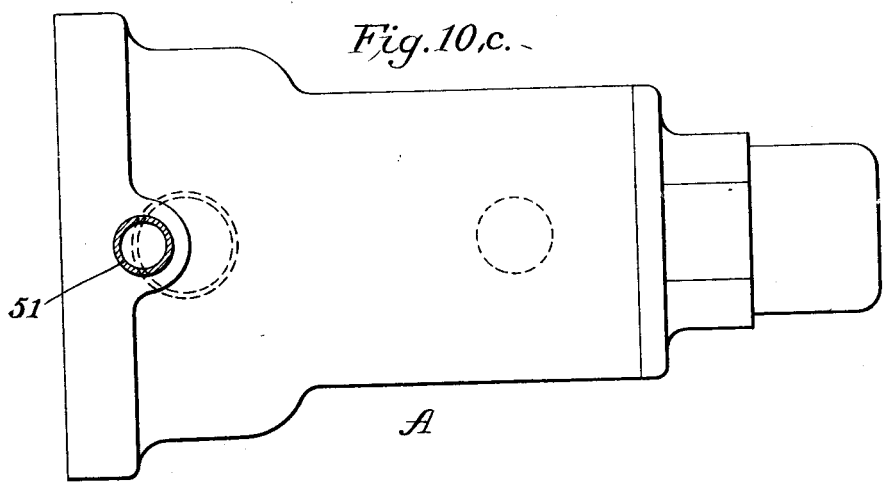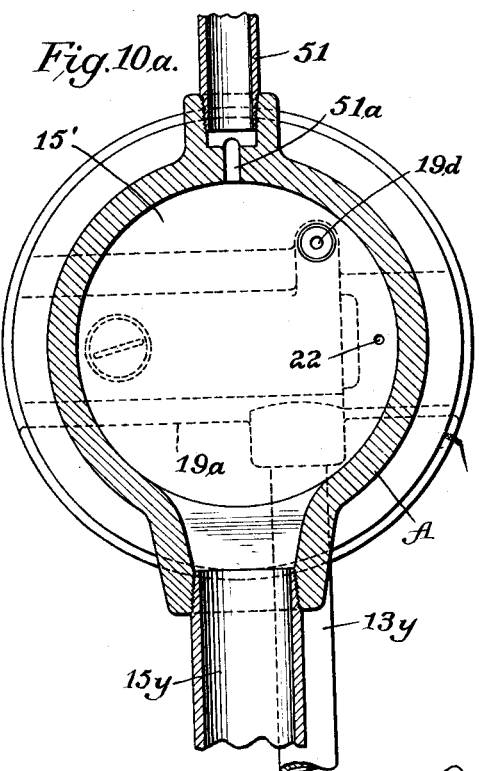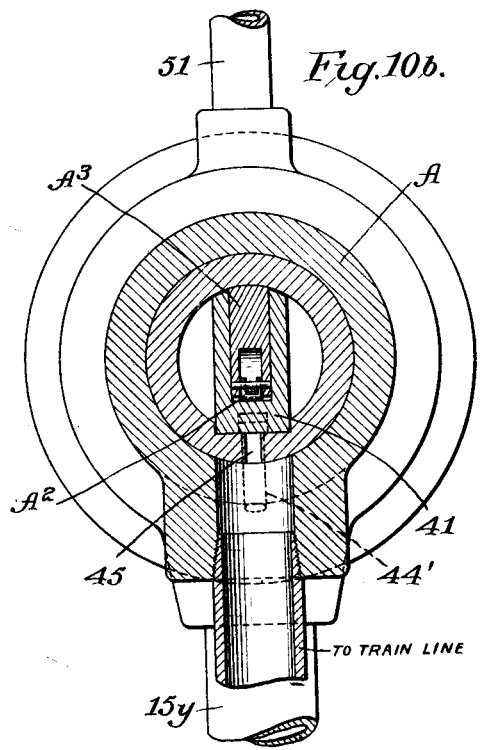

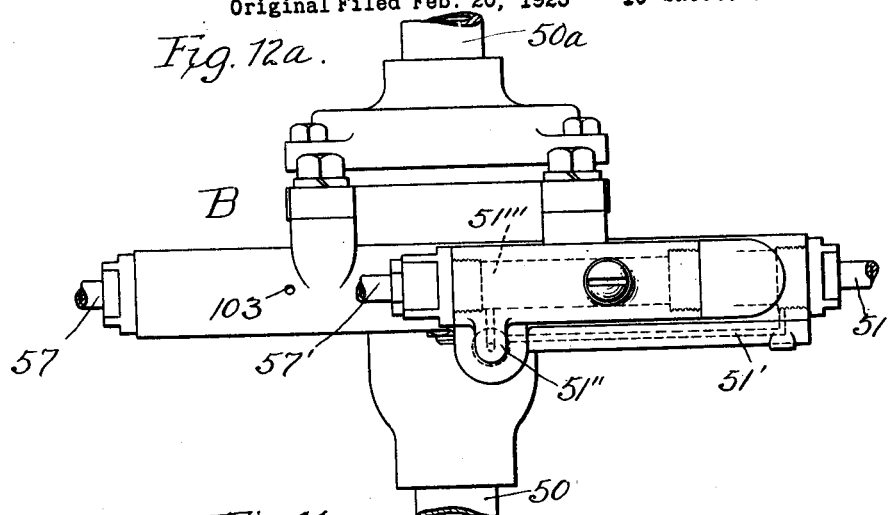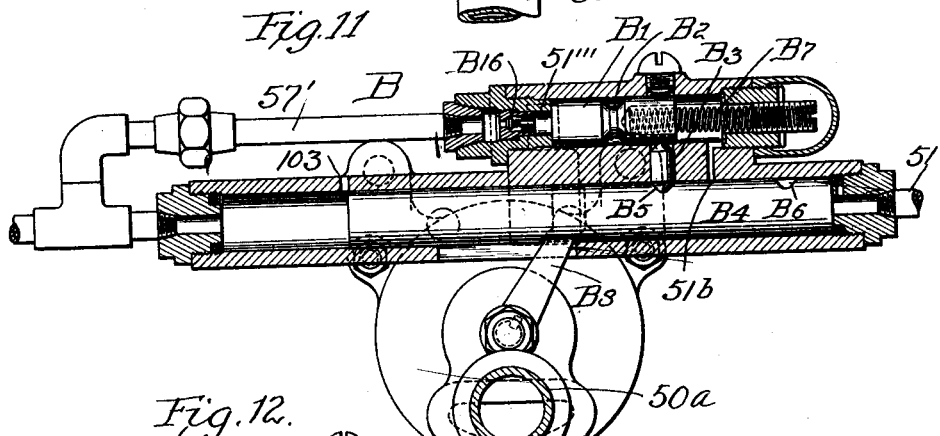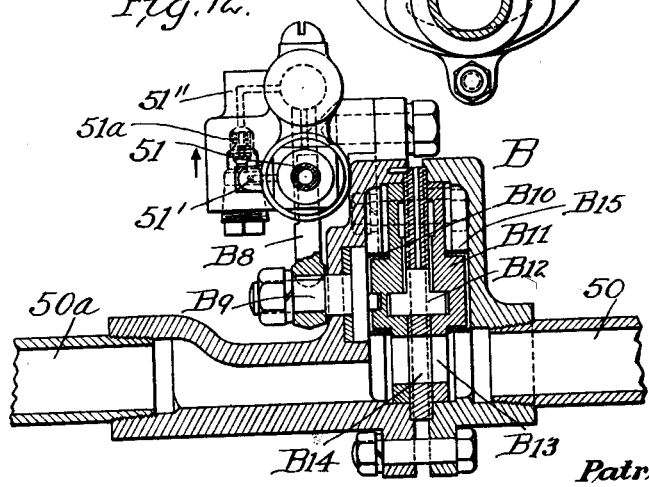

June 26, 1928.

P. J. CLIFFORD

AUTOMATIC TRAIN CONTROL APPARATUS

Original Filed Feb. 20, 1923     10 Sheets-Sheet 10

1,675,253

Inventor:
Patrick J. Clifford,
by Spear, Middleton, Donaldson & Hall
Attys.

Patented June 26, 1928.

1,675,253

UNITED STATES PATENT OFFICE.

PATRICK J. CLIFFORD, OF FALLS, PENNSYLVANIA, ASSIGNOR, BY MESNE ASSIGNMENTS, TO TRAIN CONTROL CORPORATION OF AMERICA, A CORPORATION OF DELAWARE.

AUTOMATIC TRAIN-CONTROL APPARATUS.

Application filed February 20, 1923, Serial No. 620,286. Renewed January 27, 1928.

The present Clifford system of automatic train control is a system of continuous control employing only the rails of the track for its operation, and is in no way dependent upon ramps, inductive devices and the like. The engineer is kept informed, at all times, of the condition of the track for three blocks ahead, by means of a suitable continuous cab signal. Air brake apparatus controlled by the electrical apparatus, brings the train to a stop by the service application of the brakes when the train is approaching a stop signal. The device is self checking, and any failure of the apparatus will bring the train to a stop. A superimposed current is used in connection with the track circuit and a drop in voltage between the front axle of the engine and the rear axle of the tender in train control territory is utilized as the primary impulse to control the apparatus on the vehicle. Through the primary impulse, which actuates specially designed three position polarized relays, other relays are controlled which in turn govern a solenoid which controls the air apparatus and also the cab signals. The cab signal is auxiliary to the system itself and can be used or not as desired. This signal consists of white, red, yellow and green lights from which four indications are obtained.

The device is characterized by the employment of a primary relay on the vehicle, which is in a conductor receiving electric current from the traffic carrying rail system, due to the drop in potential between the points where the ends of the conductor contact with said rail system, as through the wheels of the ordinary or standard equipment, the position of the relay armature due to the presence or absence of the prescribed current in the rail system being utilized to control electrical apparatus on the vehicle for in turn controlling the air brake apparatus and signalling means; absence of prescribed current in the rail system causing the brakes to be applied.

The apparatus is further characterized by the use of a slow acting relay controlled by the primary relay, and in turn controlling the apparatus on the vehicle; also by the use of a speed governed device and timing means controlling certain contacts of the electrical apparatus for determining the character of the signals displayed on the vehicle and the time of application of the brakes; also means whereby an advance caution signal will be given by employing said relay in polarized form and changing the polarity of the imposed current in the rail system of the advance caution block.

The apparatus also includes track circuits which will energize the rails of the blocks or deenergize them in respect to the current imposed, or change the polarity of the imposed current, according to the traffic conditions to be met. The apparatus also includes an automatic air release valve for releasing train line air, said valve being operated by equalizing air pressure which is supplied thereto through a valve arrangement controlled by the solenoid forming part of the electrical apparatus on the vehicle, this valve mechanism including an actuating valve which will prolong the supply of equalizing air to the automatic air release valve to maintain the latter in operating position for a sufficient length of time to effect a sufficient brake application to result in a stop of the train, said actuating or pressure prolonging valve, by reason of the building up of air pressure beyond it, returning to normal closed position after the lapse of a prescribed time, and bleeding air away from said automatic air release valve for the closing of the latter. The apparatus further includes an engineer's disabling valve and lock, whereby when an automatic braking action takes place the engineer can not recharge the train pipe until after the train has come to a stop.

In discussing the action of this apparatus, the description will be divided into two parts,—first, the description of the electrical apparatus, and second, the description of the air apparatus controlled thereby. The first of these two divisions naturally divides again into: (1) the track circuits and (2) the engine circuits.

In the drawings:—

Figure 1 shows the track circuits.

Fig. 2 shows the vehicle electrical equipment.

Fig. 3 is a diagram of the air part of the apparatus. The light full lines indicate the parts of the standard air brake equipment, the dot and dash lines the standard connections between these parts, and the heavy full lines indicate my improvements as incorporated with the standard equipment.

Figs. 4, 5 and 6 show the electric air supply valve.

Figs. 7, 8 and 9 are views of an air pressure supply valve for prolonging for a prescribed period the supply of air to operate the automatic air release valve for automatically applying the brakes.

Fig. 10 is a sectional view of the automatic air release valve.

Figs. 11, 12 and 12$^a$ are views of the engineer's disabling valve.

Figure 13:
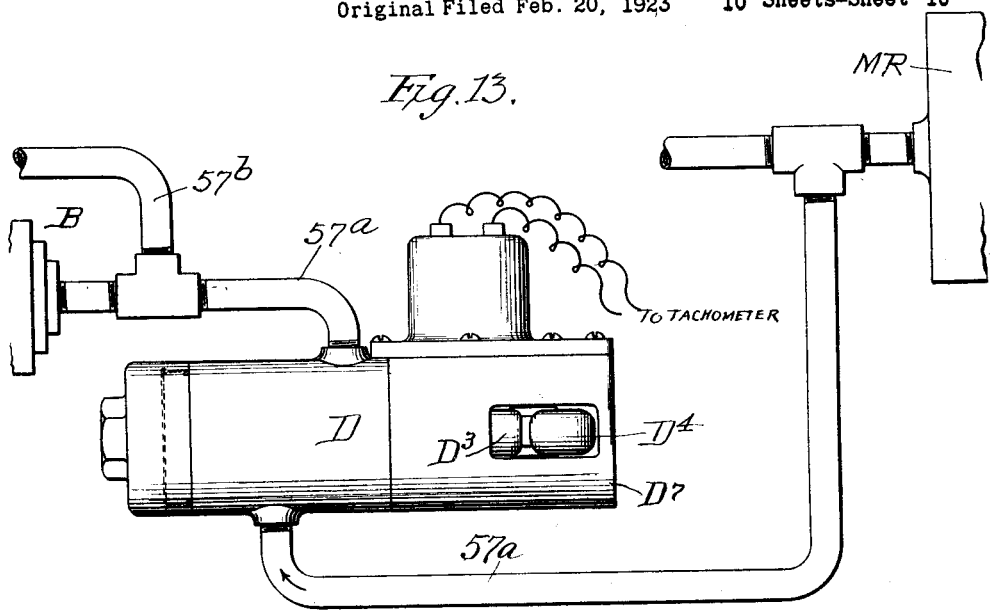
Figure 14:
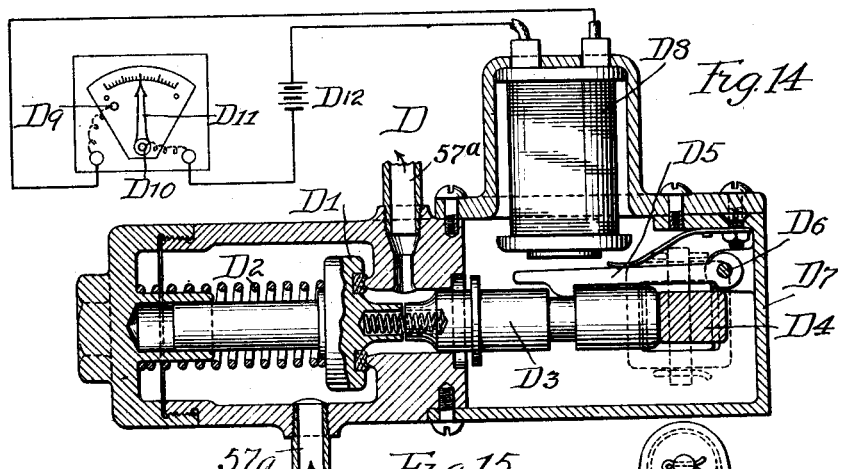
Figure 15:
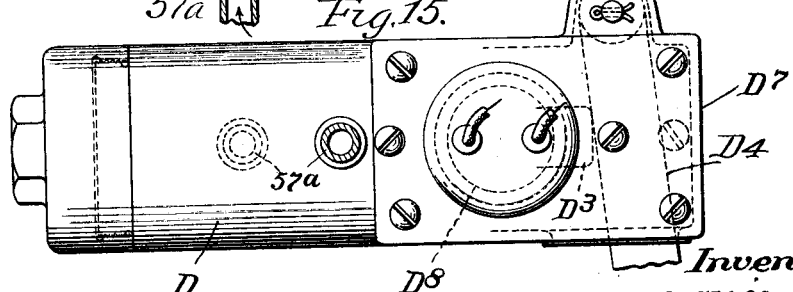

Figs. 13, 14 and 15 are views of an automatic locking means for the engineer's disabling valve.

Figs. 7$^a$ to 7$^g$ illustrate features and operations in connection with slide valve members of air supply prolonging valve.

Fig. 7$^h$ shows details of a ported valve sleeve.

Fig. 8$^a$ is a sectional view on an irregular section line of Fig. 7.

Figs. 10$^a$, 1$^b$ and 10$^c$ are views relating to the automatic air release valve.

*The electrical circuits of the Clifford system of automatic train control.*—As already described, the presence of a potential drop in one of the track rails—i. e., of a current flowing through that rail, is the means whereby the engine circuits are controlled to give a clear signal, its absence the factor for controlling the display of the caution or danger signal in the cab and the stopping of the train, and the reversal of the polarity of this current is the means whereby the engineer is advised that he is approaching a caution signal.

Referring to the diagram, Fig. 1, this shows wiring for only four blocks with advance indication in but three blocks. This wiring governs only the condition of unidirectional traffic, but it is to be understood that by a suitable development of relay connections and contacts it may be applied to any desired conditions of train movement.

The circuits used are D. C. polarized circuits of the double rail type. The imposed circuits are carried to the rails over two No. 6 B. & S. gage copper wires and equalized by keeping the voltage in the two rails balanced with the line. The imposed voltage is approximately 18 volts per circuit. In order to get the advance indication the polarity is reversed on the imposed circuit. Current is required in each block section to permit the train to proceed and in this manner the apparatus is made self checking. The circuits which can be used are the double rail imposed circuit, the single rail imposed circuit or the diagonal wired double rail imposed circuit. These have been designed to meet varying conditions and their application is not confined to D. C. steam road operation.

A detailed description of the circuits follows:—

Suppose a train enters block #3. Track relay T of the block #3 will deenergize and the contacts 125—126 will open circuit from the local battery LB and relay A$x$ contacts 123 and 124, 115 and 116 close the main circuit as follows:

Left rail: plus of the main battery III$^1$, contact 114, pole line, contacts 115 and 116, left rail from point 118 to 151, conductor 151—119, contacts 119—110, contact 111, minus of battery.

Right rail: plus of the main battery III, contact 122, pole line, contacts 123—124, right rail from point 117 to 161, conductor 161—171, contact 171—181, contact 191, minus of battery. The described paths of the main current on block #3 can exist only when the block ahead, #4, is clear. Relay A$x$ of this block is energized and contacts of this relay 119—110, 171—181 are closed. If, however, another train is on block #4, then the above described circuits of the main current on block #3 will open and the train entering this latter block will be stopped automatically by the absence of control current in the rails. See descriptions of general wiring of locomotive and air equipment. Relay B$x$ of block #3 is shown energized. This condition will exist when blocks #4 and #5 are clear. Working circuit for this relay is: relay B$x$, point 127, pole line, plus of the main battery IV on block #4, minus of battery, contacts 181—171, right rail from 161 to 117, contact 124, relay B$x$. If, however, relay A$x$ on block #5 is deenergized, by presence of another train in this block, contacts 171—181 will open above described circuit of relay B$x$ and its contacts drop. Contact arms of relay B$x$ will reverse the direction of main circuit on block #3, as can be easily traced from the drawing, this opposite direction of current in the rails will light an additional "advance signal" in the cab of the locomotive, as will be described later.

It must be understood that relay B$x$ indicated at block intersection 82.2 should be placed at each block intersection, if the wiring of the tracks is to be continued. At intersections 85.2 and 81.2 connections of relays correspond to the ends of a Clifford installation.

Fig. 2 shows the wiring diagram of locomotive and control box thereon.

Imposed track current passing through the right and the left rails produces a difference of potential between points FL and RL of the left rail and between points FR and RR of the right rail. In the present arrangement two different galvanometer or sensitive relays are used, one for the right and one for the left rail. When the current is passing in the direction corresponding to a normal clear block, the arm of the left hand unit of the galvanometer relay PR is deflected to contact point CL, and the arm of the right hand unit of the said galvanometer relay is deflected towards the contact point CL, that is to say, they are connected in such a way that deflection in the two galvanometer units will be in opposite directions. With a current in the rails corresponding to an advanced signal (opposite polarity in respect to that of a normal block) contact arm of the left hand unit is deflected to contact $Ad$ and contact arm of the right hand unit to contact $Ad$ of said unit. Contact arms of both galvanometer units as well as both contact points CL for normal deflection and points $Ad$ for advanced signal deflection are connected in multiple.

This arrangement of contacts keeps the circuit steadily closed, for if outside mechanical shocks or oscillations of the train tend to displace the arm of one of the galvanometer relay units, the other arm will be forced towards its contact, and this arrangement of circuit will be maintained without regard to mechanical oscillation of the train.

The operation of the engine circuits under various conditions now will be described. It should be kept in mind that when the engineer is approaching a clear signal, he is to receive a green light and that when approaching a caution signal he is to receive a green and a white light. After passing a caution signal, the effect varies with the speed of the train. If the train, when passing the caution signal is exceeding an arbitrary caution speed (say 25 M. P. H.) an instantaneous red light will result, and an immediate brake application will take place automatically. If, however, the engineer has reduced his speed, say to 25 M. P. H. he is permitted to proceed under a yellow light for an arbitrary time interval (say 20 seconds), after which a red light and brake application will occur, unless he has reduced his speed to a "control" speed, (say 10 M. P. H.) within that time. If the engineer has reduced speed to this value, he will receive no brake application, and may proceed under a yellow light, provided he does not exceed this speed at any time. This low speed permissive feature may be omitted if desired, or may be changed to require a stop, and then permit of starting again and running below this reduced speed.

Each of these conditions will be individually considered.

First take the condition of a clear block— i. e., approaching a clear signal.

Contact arms of relay PR are both deflected to contact points CL.

Path of the circuit: O of the battery, contacts CL in multiple, normal relay CR and plus of battery. Contact $40^x$—$37^x$ of the normal relay is therefore closed and the following path of current is established: minus of battery, contact $37^x$—$40^x$, slow acting relay SAR and plus of battery. The slow acting relay SAR has a small time element adjustable from ½ to say 5 seconds, in order to keep signal lighting current and solenoid current steady, even if current in galvanometer relays may slightly fluctuate due to dirty rails, insulating joints, etc. Contact $18^x$ of this relay being closed establishes a path of current through governor relay GOV, contacts of this relay $19^x$ and $24^x$ therefore are closed. Signal relay S and the time relay TL are connected to the plus and minus of battery as long as the contact $19^x$ is closed. Contact arm $20^x$ of the signal relay S is pulled towards contact $21^x$ and the green lamp G is lighted. Contact $23^x$ of the time relay TL is closed and relay AR and the solenoid brake 30 are kept energized at all rates of speed. Path of the current is: minus of battery, relay AR and solenoid brake 30, closed contact $23^x$, conductor from $23^x$ to closed contact $24^x$, and plus of battery. The solenoid brake 30 is so designed and associated with other parts that when energized it keeps the brakes off, but when de-energized applies them. Contact arm $25^x$ of the relay AR is closed on the contact $26^x$, but no current is passing through, because path of the current is interrupted at $20^x$.

The speed governor SG is so designed that it keeps the contacts LSL (low speed limit, and HSL (high speed limit) closed at low speed (say up to 10 M. P. H.). At medium speeds (say from 10 M. P. H. to 25 M. P. H.), contact LSL is open and HSL closed, and at high rates of speed both above contacts are open.

*Advance signal block.*—Suppose a locomotive reached a block two blocks in rear of a danger block. As has been explained, the directions of current in the rails will be opposite to normal. The arms of the sensitive relay PR will therefore swing to $Ad$, $Ad$, correspondingly. The normal relay CR therefore is deenergized and the advance signal relay ASR is energized, contacts $36^x$, $41^x$ of the relay ASR now being closed. Slow acting relay SAR in this case will be energized as before and circuit will be: minus of battery, contact $36^x$, relay SAR and plus of battery. Contact $41^x$ is provided to supply the current to the advance signal light AS (white). During the period of swinging of arms of sensitive relay from "normal" to "advance" signal position, slow acting relay keeps its contact $18^x$ closed and the action of remaining relays and solenoid brake is identical as described above in "clear block."

"*Caution block*" or "*dead block*", (*after passing caution signal*).—As soon as rails are not supplied with current, both galvanometer relay units come to a neutral position and path of current through the slow acting relay SAR is broken at $36^x$ or $37^x$—$40^x$. As it can be seen, relays GOV, S, and time relay TL become deenergized, and if

*Train is running at low speed*—relay AR and solenoid 30 will be energized. The circuit will be: minus of battery, relay AR, and solenoid 30, conductor $14^x$—$17^x$, conductor from $17^x$ to closed contact at LSL of speed governor (which contact stays closed at low speeds), conductor from point $45^x$ to point $46^x$ to point $13^x$, and plus of battery. In other words, brakes should not be applied as long as the train keeps running at low speed. The signal light circuit is: plus of battery, contacts $20^x$, $22^x$ (because relay S is deenergized), conductor $22^x$—$25^x$, contacts $25^x$—$26^x$, (because relay AR is energized) yellow light and minus of battery.

*Medium speed.*—Relay SAR is deenergized and contact $18^x$ is open as soon as the train reaches the caution block. Relays GOV, S, and the time relay TL are also deenergized. Contacts $19^x$, $24^x$ and $20^x$, $21^x$ are open as soon as all above mentioned relays are deenergized. But contact $23^x$ of the time relay TL stays closed for, say 20 seconds (or any other desirable period of time). As explained before, at the medium speed contact LSL of the speed governor SG is open and contact HSL is closed. Therefore, during this period of 20 seconds a current will pass through the solenoid brake 30 and also through relay AR as follows: minus of battery, relay AR and solenoid brake 30, contact $23^x$, conductors $10^x$—$44^x$, contact HSL of speed governor, conductor $46^x$—$13^x$, and plus of battery. During this 20 second period the light signal indicates yellow, derived as follows: plus of battery, contact $20^x$—$22^x$, conductor to $25^x$, contact $26^x$, yellow light and minus of battery. At the end of 20 seconds, contact $23^x$ opens the circuit through the solenoid brake 30 and the brakes are applied. At the same time relay AR is deenergized and its contact arm $25^x$ is thrown towards contact $27^x$ and the red light appears instead of a yellow one.

*High speed.*—Both circuit closers LSL and HSL of the speed governor are open and therefore circuit through solenoid 30 described under "medium speed" will be broken as soon as the slow acting relay SAR is deenergized, i. e., as soon as the train reaches the caution block. At the same time red light appears instead of the green and the white (advance signal).

*Air portion of the automatic train control.*—This system provides means whereby a train may be brought to a stop automatically when a danger signal is set against it, thus preventing an engineer, through carelessness or incapacity, from running by a danger signal, the train under such circumstances being brought to a stop. It correlates with the electric system in doing this and means is provided, through the electric or mechanical speed or distance control, by which an engineer so long as he is attending to his duty and is recognizing the caution signal may maintain his control and keep the train running, should he so desire, but at such reduced speed that liability of accident is removed.

In other words, with this system, an engineer when given a caution indication must control the speed of his train in the usual manner or else the control will be taken from him and automatically exerted by means of my control device and the train will be brought to a stop.

This system is designed to work in conjunction with the standard Westinghouse air brake system, or any other system, and the attachments for automatically stopping the train are operated by air pressure from the equalizing reservoir of such system admitted through an electrically controlled valve EAV with the result that if any rupture accidentally occurs in any of the parts, the pressure in the equalizing reservoir will be reduced by escape of air at the broken parts, thereby causing the piston in the automatic brake valve $H^6$ of the Westinghouse system to rise and open the brake pipe exhaust port for the escape of train line air pressure, which action will apply the brakes and stop the train. It will be understood that the electrically controlled valve EAV operates on the closed circuit principle and that the opening of its normally closed circuit by accidental breakage or by normally operated control means, as outlined in the description of my electric control circuit, will admit equalizing air to my automatic air brake applying system and thereby stop the train.

The air system which I install for controlling the air brake apparatus which may be, for instance, of the Westinghouse type, includes an automatic air release valve A to which equalizing reservoir air is directed by a valve organization $19^a$ which prolongs the supply of air to valve A for a prescribed time, as will be described hereinafter. The air supplied to valve A operates it so as to open a port $44'$ for the escape of train line air and the setting of the brakes. The valve $19^a$ which may be termed an air supply prolonging valve is operated by equalizing reservoir air which is controlled by a valve EAV which in turn is controlled electrically, it having the solenoid 30 in a normally closed circuit and which when energized will maintain the EAV valve closed and prevent air going to valve $19^a$ to operate it for supplying air to the automatic air release valve. The system also includes an engineer's disabling valve B which is operated by equalizing air pressure through the pipe 51 from the chamber 15' of the automatic air release valve A. This disabling valve when operated by equalizing air pressure through pipe 51 closes communication between the pipes 50 and 50ᵃ and hence cuts off main reservoir pressure from the engineer's automatic brake valve H⁶ and thus renders it impossible for him to recharge the train line, while the disabling valve is in closed condition. To state the operation of the parts in general terms, it may be said that when the electrical devices on the vehicle open the circuit of the solenoid 30, the EAV valve will open and supply air through pipe 40 to the valve 19ᵃ, which under pressure of this air, will open and supply equalizing reservoir air pressure through port 22 to the automatic air release valve A for operating it to open its port 44' for the escape of train line air and the setting of the brakes. This valve 19ᵃ once open, remains open, and prolongs the supply of air to the automatic service valve A for a prescribed period of time, and this is true also in respect to the engineer's disabling valve B, which latter, in addition, must be locked closed for a prescribed period of time to insure the train coming to a stop as will later be described. This period during which the valves A and B are under pressure of the air from valve 19ᵃ is determined by the time it takes for the air pressure to build up, restore valve 19ᵃ to closed position, and then bleed air away from valves B and A through an exhaust port 22'' which is opened when valve 19ᵃ is restored to closed position, all of which will be described hereinafter together with the locking means for the disabling valve to keep it closed until the train stops.

After the air pressure bleeds away from valve B, it is then necessary for the engineer to open valve B to communicate pipes 50, 50ᵃ, and this he can do by sending engine brake cylinder air pressure to this valve by operating independent brake valve S⁶ and thereafter he can recharge the train line by operating his automatic brake valve H⁶, because the restoring of the disabling valve B to open position supplies main reservoir air to the valve H⁶ so that this air pressure is now available for recharging the train line. This restoring action can be otherwise performed, as will be described.

*EAV valve.*—Taking up the construction and operation of the valves in detail and referring first to the EAV valve and associated parts, it will be seen in Fig. 4 that this valve is normally held closed on its seat by the equalizing reservoir ER air pressure in the pipe 39, which supplies it with air and also by the spring 31, and this closed condition exists so long as the solenoid 30 is energized from the electrical devices in the control box CB on the vehicle, and hence the automatic mechanism is inactive. When, however, the solenoid is deenergized as a consequence of danger or caution conditions existing, then a spring 29 will move the solenoid core leftward, together with the trip 30ᵃ, which is pivoted at 30ᵇ to an extension of the core. This trip will strike the valve stem a slight blow to start the valve off from its seat, after which it continues to push the valve further open and to the limit of its movement.

The valve then remains open until the trip 30ᵃ is moved upwardly around its pivot and releases the valve stem, whereupon the valve EAV will reseat itself under the pressure of its spring and under pressure of the air in supply pipe 39, and thus further supply of air to the system will be cut off. This lifting action of the trip 30ᵃ just mentioned takes place as soon as air pressure builds up to the required degree in chamber 15' of valve A and reacts through pipe 15ʸ upon piston 41 to lift it, against the downward pressure of its spring 43, so that the piston rod will lift the trip 30ᵃ and free the valve EAV, so that the latter may seat itself. When this valve EAV is opened, however, as above described, by the solenoid becoming deenergized, air pressure from Westinghouse equalizing reservoir ER will be delivered past this valve and through pipe 40, to the valve organization 19ᵃ, and through it to the automatic air release valve A and the engineer's disabling valve B, resulting in opening port 44' of valve A for the escape of train line air, and the closing of valve B to prevent the engineer from recharging the train line by cutting off the supply of main reservoir air pressure to his valve H⁶, for a prescribed period of time, during which the prescribed application of the brakes will take place, and the train will come to a stop because of the locking of the disabling valve as hereinafter described.

*Valve organization 19ᵃ.*—Now referring to the operation of the air supply prolonging valve 19ᵃ, Figs. 7, 8 and 9, equalizing reservoir air pressure is at all times present in chamber 13'' of this valve, being supplied thereto from pipe 39 through by-pass pipe 13ʸ, and slide valves 19ᵇ and 19ᶜ are held on their seats by equalizing air pressure.

When the EAV valve opens and supplies equalizing air pressure to pipe 40, this acts on piston $b$ and forces it to the right, pushing the slide valve section 19ᶜ and piston $b^1$ with it. The first part of this movement brings inclined port 19ᶠ in the upper slide valve section 19ᶜ over the two ports 19ᵍ in the lower slide valve section 19ᵇ and these ports exhaust air from chamber $a'$ which passes through passages 19ʰ, 19ⁱ, one of the ports 19$^g$, the inclined port 19$^f$, then down through the other port 19$^g$, then through the passage 19$^j$ to exhaust port 22″.

The lower valve section having remained in the position it assumed when restored after the previous action, the chamber 15′ remains connected with the atmosphere through port 22, 19$^j$ and 22″.

The position of the parts just described is shown in Figs. 7$^b$ and 7$^c$, the former being a plan and the latter a sectional elevation. This is the half open position of the valve. The normal position is shown in sectional elevation in Fig. 7, and in sectional plan in Fig. 7$^a$.

The second part of the movement of piston $b$ to the right brings it in contact with the lower slide valve section 19$^b$, which now also travels towards the right, and when this movement is completed, the exhaust or bleed port 22″ is first closed and then the port 22 is opened, which allows equalizing air pressure to go from chamber 13″ of the valve organization 19$^a$ to chamber 15′ of the valve organization A, where acting on the piston 46 of that valve moves it to the right and opens exhaust port 44′, as will be presently described, to discharge air from the train line for the setting of the brakes. This position of the valves is shown in Figs. 7$^d$ and 7$^e$. A bleed port 19$^k$ serves to air seal the two valve sections together.

A port 19$^l$ serves to deliver equalizing air pressure to the right of piston $b'$ when the valve is in normal position so as to retain the valve in its leftward position. This pressure bleeds off as just stated when the valve section 19$^b$ first moves rightward.

The movement of piston $b^1$ of valve organization 19$^a$ to the right, as just described, brings its wide annular locking groove 25$^a$ opposite the locking bolt or pin 26$^a$, which now enters the groove and locks the piston $b^1$. This locking effect will be due to the pressure exerted by the incline 27$^a$ of the piston 36$^a$, which is forced leftward by its spring 31$^a$, which is suitably adjustable to regulate its pressure on the piston 36$^a$. When the locking plunger or bolt is set in the groove 25$^a$, the cylindrical part of the piston 36$^a$ will have come over the bolt and thus it will be held in place to retain piston $b^1$ at the right and with the valve sections in position to deliver air through the port 22 to the chamber 15′ of automatic air release valve A.

The parts will remain in this position until pressure has built up in the system beyond this valve, i. e., in chamber 15′ of valve A and in the engineer's disabling valve A and the piping 51 leading thereto, whereupon this valve organization 19$^a$ will restore itself to its former position and allow air to bleed off from valves A and B, through port 22″, all of which will now be described. When pressure has built up in piston chamber 15′ of valve A and pipe 51 and valve B, check valve 19$^d$ will open and allow this air to go through conduit 15$^a$ into chamber 35$^a$, where it will act on the piston 36$^a$ and force it over to the right against the resistance of its spring 31$^a$, thus uncovering port 37$^a$ and bringing piston groove 27$^a$ opposite the latch 26$^a$, whereupon the spring 19$^e$, together with the pressure admitted through port 37$^a$ to chamber $a'$ behind piston $b^1$, will move the latter leftward back to normal closed position, as shown in the drawing, Fig. 7, and in this position of the parts the bleed port 22″ is uncovered under slide valve section 19$^b$, which allows built up air pressure to escape and reduce in chamber 15′ of valve A and pipe 51 leading to engineer's disabling valve B, for the restoration of these valves to normal position. After this reduction of built up pressure takes place, which will only be after the brakes have been applied, then, after the train has stopped and the disabling valve lock has been released as later described, the engineer may, by moving the handle of the Westinghouse independent brake valve S$^6$ to release position, cause valve B to move to its normal position, opening communication between pipes 50, 50$^a$, after which he may release his train brakes and recharge train line in the usual manner. The spring 19$^e$ is adjustable to regulate its pressure on the piston $b^1$.

*Automatic air release valve A.*—This valve is combined with the valve organization 19$^a$, the latter having its base plate fitted to the end of the casing of the valve organization A to serve as a head therefor, on one side of the chamber 15′. The piston 46 works in this chamber. The valve casing has a valve chamber 45′ which contains train line air pressure which acts upon the slide valve 41 to press it upon its seat. The chamber 45′ is always in communication with the train line pressure through port 45‴. When the piston 46 moves towards the right because of equalizing reservoir air let in through port 22 of the valve organization 19$^a$, the slide valve 41 will cause graduated ports 42, 43 and 44 to be brought into position in succession to communicate the train line through port 45 with the exhaust port 44′, so as to get a gradual train pipe reduction for the setting of the brakes smoothly and without jerk or shock to the train. Movement of the valve and piston towards the right takes place against the resistance of the spring 48′. The slide valve 41 is pressed by a spring A$^2$ upon its seat and it is carried back and forth by the block A$^3$. A washer A$^1$ forms an air seal to prevent the escape of air into the chamber at the right of piston 46 which is open to atmosphere, through the port A$^5$. When the washer A$^1$ is unseated, leakage is prevented by the cup-washer $A^6$, and piston ring $A^7$. The time of movement of the slide valve 41 is determined by adjusting the screw sleeve $A^8$ against the spring 48'. This spring serves to return the valve 41, and piston 46 and associated parts to normal position when the built up air pressure is released from chamber 15'. When the piston 46 and slide valve 41 are operated towards the right by air pressure admitted to chamber 15', thus opening the exhaust 44' for the escape of train line air, this condition will persist until the pressure builds up in chamber 15', and acting back through the check valve $19^d$ and the ports described, restores valve organization $19^a$ to closed position and allows this built up pressure to reduce by bleeding off through port 22''. Then spring 48' will restore valve organization A to closed condition, thus closing train line exhaust port 44' and preventing further escape of train line air.

*Engineer's disabling valve B.*—This, as before stated, is located between the pipes 50, $50^a$, which supply main reservoir air to the engineer's valve $H^6$. When equalizing air pressure is supplied to chamber 15', as above described, of valve organization A, it passes through port $51^a$ and pipe 51 to the valve organization B, where it passes through conduit 51', check valve $51^a$, port 51'' into chamber 51''' and pushes piston $B^1$ to the right until the annular locking groove $B^2$ comes opposite the locking plunger $B^3$, which is now free to move into this groove, which it now does, owing to the leftward movement of the piston $B^4$, which movement is no longer resisted by the plunger $B^3$, the latter entering the groove $B^2$ as a consequence of the inclined side of locking notch $B^5$ working under the plunger. The piston $B^4$ moves leftward because of equalizing air pressure from pipe 51 acting upon its end. The leftward movement of this piston continues until the locking notch $B^6$ in the piston $B^4$ comes under the locking plunger $B^3$, at which time a port $51^b$ is uncovered, admitting equalizing air pressure to the right of piston $B^1$, which, aided by the pressure of the spring $B^7$, moves said piston leftward, thereby causing the inclined wall of groove $B^2$ to force the locking plunger $B^3$ into the notch $B^6$, which locks piston $B^4$ in its leftward positon. Now when the piston $B^4$ moves to the left, it moves a lever $B^8$ which is keyed to a shaft $B^9$, which rotates two discs $B^{10}$ and $B^{11}$, which are keyed to each other by a key $B^{12}$. This motion of the lever $B^8$ turns the discs to close an opening $B^{13}$ in a stationary disc or partition $B^{14}$, and this cuts off communication between the pipes 50, $50^a$, thus cutting off the supply of main reservoir air from the engineer's automatic brake valve $H^6$, and therefore preventing him from recharging the train line until air pressure has bled away from the valve organization B back through pipe 51 and through bleed port 22'' to atmosphere and until after the train has stopped and has thereby caused the release of the disabling valve lock as hereinafter described. The rotary discs are held air sealed on their seats on disc $B^8$ through air seal cavities which are in communication with atmosphere and by springs $B^{15}$.

This disabling valve is returned to normal positon, opening communication between pipe 50 and $50^a$ as follows: After equalizing air pressure has been released from chamber 15' of the valve A and pipe 51 by bleeding off through port 22'' of valve organization $19^a$, then the engineer can operate the valve organization B to open position again by moving his independent brake valve $S^6$ to release position, thus alowing pressure from the application chamber of the distributing valve to go through pipe 57 and 57'. This operation of the valve $S^6$ is that which in usual practice results in exhausting engine brake cylinder pressure. The air which goes through the pipe 57' passes check valve $B^{16}$ into chamber 51''' and operates piston $B^1$ to the right against resistance of spring $B^7$, until the locking groove $B^2$ in the piston $B^1$ comes opposite the locking dog or plunger $B^3$, which is then free to rise into this groove, which it does do, owing to the incline of notch $B^6$ of piston $B^4$ working under it, which action takes place because piston $B^4$ is forced rightward by air pressure from valve $S^6$ through pipe 57. The piston $B^4$ now continues its movement to the right, until the notch $B^5$ comes opposite the plunger $B^3$. When this happens a port 103 at the left of piston $B^4$ opens and allows engine brake cylinder pressure to exhaust to atmosphere. The piston $B^1$ now moves leftward under the action of the spring $B^7$.

Leftward movement of the piston $B^1$ holds locking plunger $B^3$ down in locking position and holds piston $B^4$ until the next automatic braking action takes place. Rightward movement of the piston $B^4$ operates arm $B^5$ to turn the discs and open communication between 50 and $50^a$.

It will be clear that when valve organization B is operated by equalizing reservoir pressure to close communication between pipes 50 and $50^a$ it can not be opened again by the engineer sending air from valve $S^6$ through pipes 57, 57', until the equalizing air pressure bleeds away through port 22'', because so far as the piston $B^4$ is concerned, this is locked by the bolt $B^5$ held down by piston $B^1$, and the latter piston is pressed to the left by the equalizing pressure entering through port $51^b$ to the right of piston $B^1$, where, aided by the spring $B^7$, it will resist pressure entering through pipe 57' from valve S⁶ until, as before stated, the equalizing air pressure bleeds off through pipe 51 through chamber 15' and port 22'' of the valve organization 19ª. Then air pressure entering pipe 57' can push the piston B¹ to the right. Pressure of spring B⁷ is adjustable, and this is true of other springs of the system, where necessary or desirable.

It will be seen from the above that while the engineer is prevented from releasing the brakes until after a prescribed time has elapsed, when the automatic action takes place, the engineer is not prevented from making a greater brake pipe reduction during the period that he is disabled in respect to releasing the brakes. This is because he is disabled by cutting off main reservoir air from his valve H⁶ but this does not prevent him from making an emergency application or a greater service application than that which is derived from the automatic service application of the brakes.

It will be understood further that the valve EAV functions to initiate the operation of the automatic system, but that this valve will close as soon as back pressure to the desired degree takes place through pipe 15ʸ from the chamber 15' of the valve organization A, sufficient to operate the trip 30ª, so that valve EAV may close before the solenoid is again energized.

The organization 19ª, when operated to supply equalizing reservoir air to the automatic air release valve A for operating the latter, will remain open to continue supplying this air, even after the EAV valve closes. In other words, this valve organization 19ª will prolong the supplying of air to valve A for a period sufficient to hold valve A open long enough to make a sufficient brake application to bring the train to a stop. The closing of valve organization 19ª will not take place until pressure builds up in chamber 35ª high enough to move lock piston 36ª to the right against the pressure of spring 31ª, and uncover port 37ª so that air pressure can get into chamber a' and move piston b¹ and valve 19ᵇ leftward to close port 22, and open bleed port 22'', and then pressure must bleed off through the latter port before valve A can close and stop further train pipe reduction, and before the engineer's disabling valve can be opened again for recharging the train line.

It will be understood further that if any break occurs in the system which I have devised and use in connection with the ordinary brake apparatus of, say, the Westinghouse system, the escape of equalizing air consequent upon said break will cause a brake application to be made because the B. P. Ex. port at valve H⁶ will be opened by the ordinary equalizing piston valve and allow train line air to escape.

*Automatic lock for engineer's disabling valve.*—This mechanism will lock the disabling valve in position to maintain the disabled condition of the engineer's valve H⁶ and the inability of the engineer to recharge the train line until after the train has come to a full stop. In carrying out this part of the invention I employ main reservoir pressure for operating the engineer's disabling valve organization to open position to restore control of the releasing of the brakes to the engineer. The main reservoir air supply to disabling valve is controlled by an automatic lock valve organization designated generally at D. This includes the valve D¹, interposed in the pipes 57ª, 57ᵇ leading from the main reservoir MR to the disabling valve and taking the place respectively of pipes 57 and 57' of the form above described. This valve is pressed to its seat by a spring D², and it is opened by a rod D³ and a suitable hand lever D⁴ to be operated by the engineer.

This rod D³, so long as the train is moving, is held locked by a dog or locking device D⁵ pivotally mounted at D⁶ within the casing D⁷, which encloses this mechanism. This locking device forms an armature for an electro-magnet D⁸, in circuit with the contact D⁹ and the pivot D¹⁰ of the arm D¹¹ of a tachometer.

The electric battery is indicated at D¹². Now as long as the train is moving at all, the arm D¹¹ of the tachometer driven from the vehicle axle will break the circuit at D⁹ and the electro-magnet will be deenergized and consequently the armature D⁵ will be down in engagement with the stem D³, and consequently the engineer can not open the valve D¹ and can not restore the disabling valve to normal open position, but as soon as the train stops, then the electro-magnet D⁸ will be energized, locking dog D⁵ will be lifted, thus releasing stem D³, and therefore the engineer can open valve D¹ by operating hand lever D⁴ and MR air pressure will be sent to the disabling valve through pipe 57ª and its branch 57ᵇ, and said valve will be restored to normal open position, thus supplying main reservoir air to the engineer's brake valve H⁶ to be utilized for recharging the train line pipe at the will of the engineer by operating said valve H⁶.

It will be understood that instead of employing the valve D¹ and controlling this by the automatic lock, as just described, I may dispense with the valve D¹ and use the lock D⁵, the electro-magnet and tachometer control directly in connection with one of the movable parts of the engineer's disabling valve B, for instance, this lock may be used to cooperate with the piston B⁴, and to lock the same in the position it assumes when the engineer's disabling valve is closed, and to maintain this locked condition so long as the train has any movement whatsoever. In this modification, the connections 57ª, 57ᵇ to the main reservoir would not be used, but instead the engineer would restore this valve B to its open condition by sending air through pipe 57 and its branch 57' from the engineer's independent valve S⁶.

It will be seen that this appliance for locking the valve is self checking, that is, if the circuit fails in which the tachometer is located, the electro-magnet will be deenergized and the lock will become effective or remain so until the proper connection is again established.

Ordinary reducing valves are employed as usual in the system Y. Air strainers may be employed at any desired points.

It is important that the apparatus be of compact form, not only in its general lay-out, but as to its individual parts, so that little space will be taken up in the cab. The valve organization 19ª is arranged with its main axis at right angles to the axis of the automatic air release valve A, and its base plate acts as the head for said valve organization A. This economizes space.

It will be understood that my system is not of a "permissive" character. If the engineer does not obey the indication, control will be taken out of his hands. The valve A when operated will remain open for a prescribed brake application, but closing, as previously stated, to prevent further escape of train line air, and the disabling valve will be locked closed until the train comes to a stop. The engineer can not, during this time, defeat automatic braking. He can not recharge the train line because the maintained closed condition of the disabling valve will cut off the supply of air from the main reservoir, but he can make a further train pipe reduction by setting his valve in service or emergency position. Only after the train has come to a stop can the engineer restore the disabling valve, because, prior to this stopping, the disabling valve will be held closed, the bleeding off of operative air and cessation of train movement being the prerequisites to the release of the disabling valve and the possibility of restoring it to open position by a manual action on the part of the engineer.

The primary relay may be of any of the forms and connected up in any of the ways shown for instance in application filed by me January 5, 1923, Serial No. 610,880.

No amplification of the picked up current in the primary relay is necessary in connection with this relay.

I do not limit myself to direct current operated track circuits nor to a direct current operated primary relay.

While I have shown valves of different form specifically from those heretofore disclosed by me, it will be understood that I do not limit myself to these specific forms but that any of the forms shown in my previous applications may be employed in carrying out features of the present invention, thus for instance, the EAV, solenoid arrangement, air supply prolonging valve, the automatic air release valve, and engineer's disabling valve may be of the previous forms, in carrying out certain features of the present invention.

I do not limit myself to the use of springs for operating certain of the elements of the apparatus and the drawings and description are to be regarded as illustrative of the invention and not as limiting the scope thereof, which is defined by the accompanying claims.

Valve organization 19ª is substantially a modification of the trigger valve described in my application No. 4,484 filed Jan. 24, 1925, in that the trigger piece or locking bolt 26ª retains the valve in open position until pressure has built up sufficiently to operate the piston 36ª.

Certain features disclosed herein are embodied in other applications No. 284,731 filed March 24, 1919, No. 553,429 filed April 17, 1922, and No. 610,879 filed Jan. 5, 1923.

I claim:

1. In combination in train stop apparatus, a primary relay on the vehicle of duplex form each member of which includes a movable contact arm and a pair of contacts cooperating therewith connected in multiple, one of said members receiving current through a conductor from the traffic rail on one side of the vehicle and the other receiving current through a conductor from the other traffic rail on the other side of the vehicle, due to the potential drop between the points of contact of said conductors respectively with the traffic rail, the said movable contacts moving in opposite directions with respect to each other and against one set of contacts when current passes through the duplex relay, assuming neutral position when no current is passing, and moving against the other contacts when the polarity of the current changes but moving in opposite directions relative to each other, and train control means on the vehicle controlled by the relay, substantially as described.

2. In combination in train stop apparatus a primary relay on the vehicle of duplex form, each member of which includes a movable contact arm and a pair of contacts cooperating therewith connected in multiple, one of said members receiving current through a conductor from the traffic rail on one side of the vehicle and the other receiving current through a conductor from the other traffic rail on the other side of the vehicle, due to the potential drop between the points of contact of said conductors respectively with the traffic rail, the said movable contacts moving in opposite directions with respect to each other and against one set of contacts when current passes through the duplex relay, assuming neutral position when no current is passing, and moving against the other contacts when the polarity of the current changes, but moving in opposite directions relative to each other, and train control means on the vehicle controlled by the relay, and signals on the vehicle controlled by the duplex relay, substantially as described.

3. In train control apparatus, a duplex primary relay on the vehicle, one member of which is in a conductor receiving current from one of the traffic rails due to the potential drop between its points of contact therewith and the other member of which is in another conductor receiving current from the other rail due to the potential drop between its points of contact with said other rail, and means on the vehicle controlled by the members of the duplex relay jointly, said means being controlled by either member singly if the other member fails, substantially as described.

4. In train control apparatus, a duplex primary relay on the vehicle, one member of which is in a conductor receiving current from one of the traffic rails due to the potential drop between its points of contact therewith and the other member of which is in another conductor receiving current from the other rail due to the potential drop between its points of contact with said other rail, and means on the vehicle controlled by the members of the duplex relay jointly, said means being controlled by either member singly if the other member fails, said members of the duplex relay operating in reverse directions in respect to each other so that jar or shock which tends to put one member out of service will tend to maintain the other member in service, substantially as described.

5. In combination in train control apparatus, a primary relay on the vehicle, in a conductor receiving current from the traffic rail system due to the drop in potential between its points of contact therewith, a contact which is closed by said relay when normal current is present in said rail system, a contact which is closed by said relay when a reverse polarity current is present in said rail system, said relay being in neutral position when no current is passing, a normal current relay, energized by the primary relay when normal polarity current is present in the rails, an advance signal relay controlled by the primary relay when a current of reverse polarity is present in the rail system and train control means on the vehicle controlled by said normal and advance signal relays, substantially as described.

6. In combination in train control apparatus, a primary relay on the vehicle, in a conductor receiving current from the traffic rail system due to the drop in potential between its points of contact therewith, a contact which is closed by said relay when normal current is present in said rail system, a contact which is closed by said relay when a reverse polarity current is present in said rail system, said relay being in neutral position when no current is passing, a normal current relay, energized by the primary relay when normal polarity current is present in the rails, an advance signal relay controlled by the primary relay when a current of reverse polarity is present in the rail system and train control means on the vehicle controlled by said normal and advance signal relays, said means including a slow acting relay and apparatus controlled thereby.

7. In combination in train control apparatus, a main battery for each rail of the track in each block, a main relay in each block controlling contacts in circuit with the rails and said batteries, a track relay and a track battery for each block, a local battery for each block controlled by said track relay, said local battery being in circuit with the main relay of the block to which the local battery belongs, and a relay in each block for reversing the polarity of the current of the main batteries when the second block has caution or danger conditions existing thereat, the main circuits of each unoccupied block being normally open, closed when occupied, with clear conditions ahead, and open when caution or danger conditions exist ahead and having their currents reversed as to polarity when caution conditions exist in the second block next ahead, substantially as described.

8. In combination in apparatus of the class described, a main battery in each block to impose current on a traffic rail thereof, a main relay in each block controlling the circuit of said battery and rail, a track battery for each block, and a track relay for each block, a local battery in each block in circuit with the main relay of that block, said local battery circuit being controlled by the track relay, the main circuit of each block being normally open, closed when occupied with clear conditions ahead and open when caution or danger conditions exist ahead, substantially as described.

9. In combination in apparatus of the class described, a main battery in each block to impose current on a traffic rail thereof, a main relay in each block controlling the circuit of said battery and rail, a track battery for each block, and a track relay for each block, a local battery in each block in circuit with the main relay of that block, said local battery circuit being controlled by the track relay, the main circuit of each block being normally open, closed when occupied, with clear conditions ahead and open when caution or danger conditions exist ahead, and a relay for each block to reverse the polarity of the main current imposed on the rail when caution or danger conditions exist in the second block ahead, substantially as described.

10. In apparatus of the class described, an automatic air release valve for releasing train line air when operated, a valve for supplying air to said automatic air release valve for operating it to release train line air, a supply valve opening against the pressure of the air supply, a solenoid arranged coaxially with the said air supply valve, and having its core arranged to open said valve when the solenoid is de-energized, a trip pivoted to the core and arranged to push against the valve stem, and means operated by the air pressure when built up at the automatic release valve for operating the said trip to allow the said supply valve to return to normal closed position.

11. In combination in apparatus of the class described, an automatic air release valve for releasing train line air when operated, a valve for supplying air pressure for operating the automatic air release valve, a casing in which said valve is seated, said valve opening against the air supply pressure, a solenoid within said casing having its core coaxially arranged in respect to the axis of the supply valve, a trip carried by the core to contact with and open the supply valve, a spring for operating the core to open said valve when the solenoid is deenergized, and means for operating said trip to release the air supply valve and allow it to seat itself, said means consisting of a piston and cylinder receiving back pressure from the automatic air release valve for its operation, substantially as described.

12. In combination an automatic air release valve, an electro-magnetically controlled valve for supplying air pressure, an air supply prolonging valve having locking means for holding it open to prolong the supply of air to the automatic air release valve, said air supply prolonging valve being operated by air pressure from the electro-magnetically controlled valve, means for disconnecting the electro-magnetically operated valve from its electro-magnetic operating means including a cylinder and piston, means for delivering back pressure to said piston from the built up pressure operating on the automatic air release valve, and means for delivering similar back pressure from the automatic air release valve for unlocking the air supply prolonging valve and means for closing the same when unlocked, substantially as described.

13. In combination in a train stop system, an automatic air release valve for reducing train line pressure, means for supplying air pressure for operating said valve, including an air supply valve, having locking means for holding said valve in open position to prolong the supply of operating air to the automatic air release valve, said valve including a slidable valve and a piston connected thereto axially in line therewith and having a locking notch, a lock to engage said notch, a second piston moving in a separate chamber parallel with the first and having a recess to receive said lock and a plain portion to hold said lock in locking position, said valve and piston being operated by air pressure and springs, substantially as described.

14. In apparatus of the class described, an engineer's disabling valve, an automatic air release valve, said valves receiving operative air when the automatic action takes place, to open the air release valve and close the disabling valve to prevent the engineer from recharging train line, said disabling valve comprising a piston operated by air pressure in both directions, a lock for said piston to hold it at the opposite ends of its strokes, a lock controlling piston controlling said lock, an air supply to one end of the lock controlling piston from the operative air supply, a port controlled by the first piston when at the end of its movement in one direction to supply air pressure to the other end of said locking piston, to move it to set the lock, an independent brake valve and a connection for sending air therefrom to the pistons of the disabling valve, to return them to normal position, but only after the operative air has been bled away from the pistons of the disabling valve, and means operated by the piston first mentioned to close a pipe supplying the engineer's automatic brake valve to prevent the engineer from recharging the train line, substantially as described.

15. In combination in apparatus of the class described a valve having a piston with a V-shaped notch therein, a lock for said piston having its end adapted to engage said V-shaped notch, a second piston also having a V-shaped notch and working in conjunction with the other end of said lock, means for delivering air pressure to the pistons for operating them and means operated by one of the pistons for controlling an air conduit, substantially as described.

16. In combination in apparatus of the class described, an automatic air release valve, an engineer's disabling valve, a valve controlling air pressure to open said disabling valve to restore control to the engineer, a lock for holding said valve closed while the train is running, and means for automatically controlling said locking means to maintain it in service while the train is moving, but to free it for manual operation by the engineer when the train comes to a stop, substantially as described.

17. In combination in apparatus of the class described, an automatic air release valve, an engineer's disabling valve, a valve controlling air pressure to open said disabling valve to restore control to the engineer, a lock for holding said valve closed, while the train is running, and means for automatically controlling said locking means to maintain it in service while the train is moving, but to free it for manual operation by the engineer when the train comes to a stop, said controlling means including an electro-magnet of which said lock forms the armature and a tachometer for energizing said electro-magnet when the train stops and deenergizes the same when the train is moving so that the apparatus will be self checking in the sense that failure of control will cause the lock to remain set.

18. In combination in train control apparatus, automatic means for stopping the train operated by equalizing reservoir air pressure, an automatic air release valve, an engineer's automatic brake valve for controlling the train line, a disabling valve for said engineer's valve, located in the supply pipe from the main reservoir to the said engineer's valve, said disabling valve being operated to disable the engineer by equalizing reservoir pressure, means for opening said automatic air release valve and disabling valve after a prescribed lapse of time determined by the bleeding away of equalizing reservoir pressure from the disabling valve and from the automatic air release valve forming a part of the system, a valve for prolonging the supply of operative air to this automatic air release valve and disabling valve, said supply valve being locked open for a prescribed time, until back pressure releases said lock, whereupon said supply valve effects the bleeding away of the operative air, substantially as described.

19. In a train stop system, the combination of means for automatically applying the brakes when restrictive conditions exist, a valve for disabling the engineer's valve from use in recharging the train line, means for automatically locking said valve in position to perform its disabling function, means for automatically releasing said lock when a prescribed condition relative to safety has been reached, and means under the manual control of the engineer consisting of the independent brake valve, for restoring said disabling valve to normal position after it has been released, substantially as described.

20. In a train stop system the combination of means for automatically applying the brakes including an automatic air release valve for the train line, an engineer's disabling valve, means for supplying operative air to said valves, means for automatically bleeding operative air away from said valves after a prescribed period of time has elapsed, locking means for maintaining the engineer's disabling valve in disabling position until the train comes to a stop to prevent the engineer from recharging the train line, and means under the control of the engineer for restoring the disabling valve to open position, substantially as described.

21. In combination in a train stop system, means for automatically applying the brakes if the engineer fails to obey an indication of restrictive conditions ahead, a valve for automatically disabling the engineer's automatic brake valve, means for automatically supplying equalizing reservoir air pressure for bringing on an automatic braking action and for closing the disabling valve, said disabling valve being in the connection leading from the main air reservoir to the engineer's automatic brake valve to prevent him from recharging the train line as long as said disabling valve is closed, but allowing him to augment the train line reduction as inaugurated by the automatic brake means, substantially as described.

22. In combination in a train stop system, means for automatically applying the brakes if the engineer fails to obey an indication of restrictive conditions ahead, a valve for automatically disabling the engineer's automatic brake valve, means for automatically supplying equalizing reservoir air pressure for bringing on an automatic braking action and for closing the disabling valve, said disabling valve being in the connection leading from the main air reservoir to the engineer's automatic brake valve to prevent him from recharging the train line as long as said disabling valve is closed, but allowing him to augment the train line reduction as inaugurated by the automatic brake means, said apparatus applying the brakes automatically through reduction of pressure in the equalizing piston chamber of the automatic brake valve should any part of the system break and allow equalizing air to be discharged, substantially as described.

23. In combination in a train stop system, means for automatically applying the brakes if the engineer fails to obey an indication of restrictive conditions ahead, a valve for automatically disabling the engineer's automatic brake valve, means for automatically supplying equalizing reservoir air pressure for bringing on an automatic braking action and for closing the disabling valve, said disabling valve being in the connection leading from the main air reservoir to the engineer's automatic brake valve to prevent him from recharging the train line as long as said disabling valve is closed, but allowing him to augment the train line reduction as inaugurated by the automatic brake means, said automatic brake means for supplying equalizing reservoir air means for supplying the supply to the automatic prolonging the supply to the automatic brake means and the disabling valve until the pressure builds up thereat and by its back pressure restores said supply means to normal position, thereby opening a bleed port for the release of operative air from said automatic brake means and the disabling valve, substantially as described.

24. In combination in a train stop system, means for automatically applying the brakes if the engineer fails to obey an indication of restrictive conditions ahead, a valve for automatically disabling the engineer's automatic brake valve, means for automatically supplying equalizing reservoir air pressure for bringing on an automatic braking action and for closing the disabling valve, said disabling valve being in the connection leading from the main air reservoir to the engineer's automatic brake valve to prevent him from recharging the train line as long as said disabling valve is closed, but allowing him to augment the train line reduction as inaugurated by the automatic brake means, and means for automatically locking the disabling valve in closed position and means for automatically releasing the said locking means when a prescribed condition of safety exists, substantially as described.

25. In combination in an air brake apparatus, an air reservoir, a train pipe, an automatic air release valve for releasing air from the train pipe to set the brakes, a connection leading thereto to deliver air pressure to said valve, an air supply valve controlling the said connection, air pressure operated means for opening said valve, air pressure operated returning means for said valve, a lock for said valve, air pressure operated means for releasing the lock, said valve returning means and said lock releasing means being operated by the building up of pressure between the said air supply valve and the automatic air release valve, an engineer's independent brake valve, an engineer's automatic brake valve for reducing or recharging train line air, a disabling valve located in the main reservoir pipe leading through the disabling valve to the engineer's automatic brake valve, a connection for supplying air pressure admitted by the air supply valve to the disabling valve for closing it to disable the engineer from recharging the train line, means for bleeding the pressure from the automatic air release valve and the disabling valve when the air supply valve is returned to normal position, and a connection from the engineer's independent brake valve to the disabling valve to restore the same to normal position, substantially as described.

26. An automatic air release valve, an engineer's disabling valve in the pipe which supplies main reservoir air to the engineer's automatic brake valve, means for automatically closing said valve to cut off the supply of main reservoir air to the engineer's automatic brake valve, and an air supply connection from the engineer's straight air valve for restoring the disabling valve, substantially as described.

In testimony whereof, I affix my signature.

PATRICK J. CLIFFORD.